United States Patent
Suzuki et al.

(10) Patent No.: US 11,966,650 B2
(45) Date of Patent: Apr. 23, 2024

(54) INFORMATION PROCESSING APPARATUS, NON-TRANSITORY COMPUTER READABLE MEDIUM STORING INFORMATION PROCESSING PROGRAM, AND ARTICLE ORDER RECEPTION AND PLACEMENT SYSTEM

(71) Applicant: FUJIFILM Business Innovation Corp., Tokyo (JP)

(72) Inventors: Takuma Suzuki, Tokyo (JP); Yoshihito Seguchi, Tokyo (JP); Kimihiko Isobe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 475 days.

(21) Appl. No.: 17/168,115

(22) Filed: Feb. 4, 2021

(65) Prior Publication Data
US 2022/0075581 A1 Mar. 10, 2022

(30) Foreign Application Priority Data
Sep. 9, 2020 (JP) .................. 2020-151530

(51) Int. Cl.
G06F 3/12 (2006.01)

(52) U.S. Cl.
CPC .......... *G06F 3/1272* (2013.01); *G06F 3/1204* (2013.01); *G06F 3/1275* (2013.01)

(58) Field of Classification Search
None
See application file for complete search history.

(56) References Cited

U.S. PATENT DOCUMENTS

| 9,430,174 B2 * | 8/2016 | Kuranoshita | G06F 3/1268 |
| 2010/0165376 A1 * | 7/2010 | Matsuyama | G06F 3/1288 358/1.14 |
| 2019/0065127 A1 * | 2/2019 | Wagatsuma | G03G 15/6523 |

FOREIGN PATENT DOCUMENTS

JP 5977790 8/2016

* cited by examiner

*Primary Examiner* — Helen Zong
(74) *Attorney, Agent, or Firm* — JCIPRNET (57) ABSTRACT

An information processing apparatus includes a processor configured to convert, using a conversion rule prescribing an association between order reception information on an article and manufacturing information used by each of plural manufacturers manufacturing the article in accordance with the order reception information on the article, the order reception information into the manufacturing information used by a designated manufacturer that is requested to manufacture the article.

19 Claims, 9 Drawing Sheets

| | |
|---|---|
| ORDER RECEPTION RESPONSIBLE DEPARTMENT | FIRST MANUFACTURING DEPARTMENT |
| ORDER RECEPTION RESPONSIBLE PERSON | YAMADA A JI |
| ORDER RECEPTION RESPONSIBLE PERSON ID | 001 |
| DELIVERY BUSINESS NAME | A TRANSPORT |
| DELIVERY BUSINESS ID | 002 |
| ⋮ | ⋮ |

| ITEM OF ORDER RECEPTION INFORMATION | CONTENT OF ORDER RECEPTION INFORMATION | PRINTING INFORMATION OF PRINTING BUSINESS |
|---|---|---|
| PAPER ID | 001: | 003 |
| | 002: | 005 |
| FINISH STANDARD ID | 501: | 305 |
| | 502: | 308 |
| PRINTING STEP | OFFSET PRINTING | OFFSET PRINTING |
| ⋮ | ⋮ | ⋮ |

| ITEM NAME | IMPOSITION TYPE ID |
|---|---|
| CONTENT | 001 |

| ITEM OF ORDER RECEPTION INFORMATION | CONTENT |
|---|---|
| NUMBER OF ORDERED COPIES | 100 TO 499 |
| FINISH STANDARD ID | 300 TO 400 |
| PAPER ID | 003 |

| ITEM OF ORDER RECEPTION INFORMATION | CONTENT OF ORDER RECEPTION INFORMATION | SET ORDER RECEPTION INFORMATION | PRINTING FACILITY OF PRINTING BUSINESS |
|---|---|---|---|
| PRINTING STEP | OFFSET PRINTING | PRINTING MACHINE | PRINTER NO. 1 |
|  | RELIEF PRINTING |  | PRINTER NO. 2 |
| TREATMENT STEP | PERFECT BINDING | TREATMENT MACHINE | FOLDER A BINDER C |
|  | SIDE-STITCH BINDING |  | FOLDER B BINDER A |

| ITEM OF ORDER RECEPTION INFORMATION | CONTENT OF ORDER RECEPTION INFORMATION | PRINTING INFORMATION OF PRINTING BUSINESS A | PRINTING INFORMATION OF PRINTING BUSINESS B |
|---|---|---|---|
| NUMBER OF ORDERED COPIES | - | - | - |
| ORDER RECEPTION RESPONSIBLE DEPARTMENT | - | FIRST MANUFACTURING DEPARTMENT | FOURTH MANUFACTURING DEPARTMENT |
| ORDER RECEPTION RESPONSIBLE PERSON | - | YAMADA A JI | SASAGAWA B MI |
| ORDER RECEPTION RESPONSIBLE PERSON ID | - | 001 | 208 |
| DELIVERY BUSINESS NAME | - | A TRANSPORT | B EXPRESS |
| DELIVERY BUSINESS ID | - | 002 | 113 |
| PAPER ID | 001 | 003 | 002 |
| | 002 | 005 | 003 |
| FINISH STANDARD ID | 501 | 305 | 100 |
| | 502 | 308 | 107 |
| IMPOSITION TYPE ID | - | - | - |
| PRINTING STEP | OFFSET PRINTING | OFFSET PRINTING | - |
| | RELIEF PRINTING | RELIEF PRINTING | RELIEF PRINTING |
| PRINTING MACHINE | - | (OFFSET PRINTING): PRINTER NO. 1 (RELIEF PRINTING): PRINTER NO. 2 | (OFFSET PRINTING): PRINTER A (RELIEF PRINTING): PRINTER B |
| TREATMENT STEP | PERFECT BINDING | PERFECT BINDING | PERFECT BINDING |
| | SIDE-STITCH BINDING | SIDE-STITCH BINDING | SIDE-STITCH BINDING |
| TREATMENT MACHINE | - | (PERFECT BINDING): FOLDER A BINDER C (SIDE-STITCH BINDING): FOLDER B BINDER A | (PERFECT BINDING): FOLDER A BINDER A (SIDE-STITCH BINDING): FOLDER B BINDER B |
| ⋮ | ⋮ | ⋮ | ⋮ |

| ITEM OF ORDER RECEPTION INFORMATION | PRINTING BUSINESS | ITEM OF REFERRED ORDER RECEPTION INFORMATION | CONTENT OF ORDER RECEPTION INFORMATION | SET CONTENT |
|---|---|---|---|---|
| IMPOSITION TYPE ID | PRINTING BUSINESS A | NUMBER OF ORDERED COPIES | 100 TO 499 | 003 |
| | | FINISH STANDARD ID | 500 TO 600 | |
| | | PAPER ID | 001 | |
| | | NUMBER OF ORDERED COPIES | 100 TO 499 | 004 |
| | | FINISH STANDARD ID | 500 TO 600 | |
| | | PAPER ID | 002 | |
| | PRINTING BUSINESS B | NUMBER OF ORDERED COPIES | 200 TO 500 | 002 |
| | | FINISH STANDARD ID | 100 TO 200 | |
| | | PAPER ID | 002 | |
| PRINTING MACHINE | PRINTING BUSINESS A | PRINTING STEP | OFFSET PRINTING | PRINTER NO. 1 |
| | | | RELIEF PRINTING | PRINTER NO. 2 |
| | PRINTING BUSINESS B | PRINTING STEP | RELIEF PRINTING | PRINTER NO. 3 |
| TREATMENT MACHINE | PRINTING BUSINESS A | TREATMENT STEP | PERFECT BINDING | FOLDER A BINDER C |
| | | | SIDE-STITCH BINDING | FOLDER B BINDER A |
| | PRINTING BUSINESS B | TREATMENT STEP | PERFECT BINDING | FOLDER A BINDER A |
| | | | SIDE-STITCH BINDING | FOLDER B BINDER B |
| ⋮ | ⋮ | ⋮ | ⋮ | ⋮ |

INFORMATION PROCESSING APPARATUS, NON-TRANSITORY COMPUTER READABLE MEDIUM STORING INFORMATION PROCESSING PROGRAM, AND ARTICLE ORDER RECEPTION AND PLACEMENT SYSTEM

CROSS-REFERENCE TO RELATED APPLICATIONS

This application is based on and claims priority under 35 USC 119 from Japanese Patent Application No. 2020-151530 filed Sep. 9, 2020.

BACKGROUND

(i) Technical Field

The present invention relates to an information processing apparatus, a non-transitory computer readable medium storing an information processing program, and an article order reception and placement system.

(ii) Related Art

JP5977790B discloses a printed matter production system including an order reception server that manages order reception information on a printed matter, and a printing management server that manages a printing job related to production of the printed matter. The order reception server includes a transmission processing portion that transmits an electronic operation instruction document including the order reception information to the printing management server. The printing management server includes an item categorization portion that categorizes a plurality of items specifying an execution content of the printing job into a specifiable item uniquely determined by the electronic operation instruction document transmitted from the transmission processing portion and an unspecifiable item not uniquely determined, a job information creation portion that creates job information describing the printing job by deciding a content of one or more unspecifiable items categorized by the item categorization portion in accordance with a principle, and a job information database that stores the job information created by the job information creation portion in association with a management identification number of the printing job.

SUMMARY

In recent years, an article order reception and placement system that receives a manufacturing request of an article from a customer through an order reception site, selects any manufacturer from a plurality of manufacturers registered in advance on the order reception site, and requests the selected manufacturer to manufacture an article of an order received on the order reception site has started being used.

The plurality of manufacturers registered on the order reception site manufacture articles independently of each other and thus, recognize identical details with different expressions unique to the respective manufacturers and manufacture the articles using different manufacturing steps and different manufacturing facilities. Meanwhile, order reception information is generated on the order reception site with an expression used on the order reception site.

Accordingly, in a case where the manufacturer receives the order reception information on the article of the order received from the customer on the order reception site, a situation where an instruction content represented in the order reception information is misunderstood or the instruction content is not understood occurs in a case where an expression different from the expression used by the manufacturer is included in the order reception information.

However, for example, commonizing expressions of information used for manufacturing the articles, the manufacturing steps of the articles, and the used manufacturing facilities among the plurality of manufacturers registered on the order reception site is not realistic.

Aspects of non-limiting embodiments of the present disclosure relate to an information processing apparatus, a non-transitory computer readable medium storing an information processing program, and an article order reception and placement system that, in a case of requesting any of a plurality of manufacturers to manufacture an article of an order received through an order reception site, prevent inconsistency related to information on the requested article between the order reception site and each manufacturer even in a case where information used on the order reception site is different from information used by each manufacturer with respect to an item necessary for manufacturing the article.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to convert, using a conversion rule prescribing an association between order reception information on an article and manufacturing information used by each of a plurality of manufacturers manufacturing the article in accordance with the order reception information on the article, the order reception information into the manufacturing information used by a designated manufacturer that is requested to manufacture the article.

BRIEF DESCRIPTION OF THE DRAWINGS

Exemplary embodiment(s) of the present invention will be described in detail based on the following figures, wherein.

DETAILED DESCRIPTION

Hereinafter, the present exemplary embodiment will be described with reference to the drawings. Identical constituents and identical processing will be designated by identical reference signs through all of the drawings, and description will not be repeated.

Figure 1:
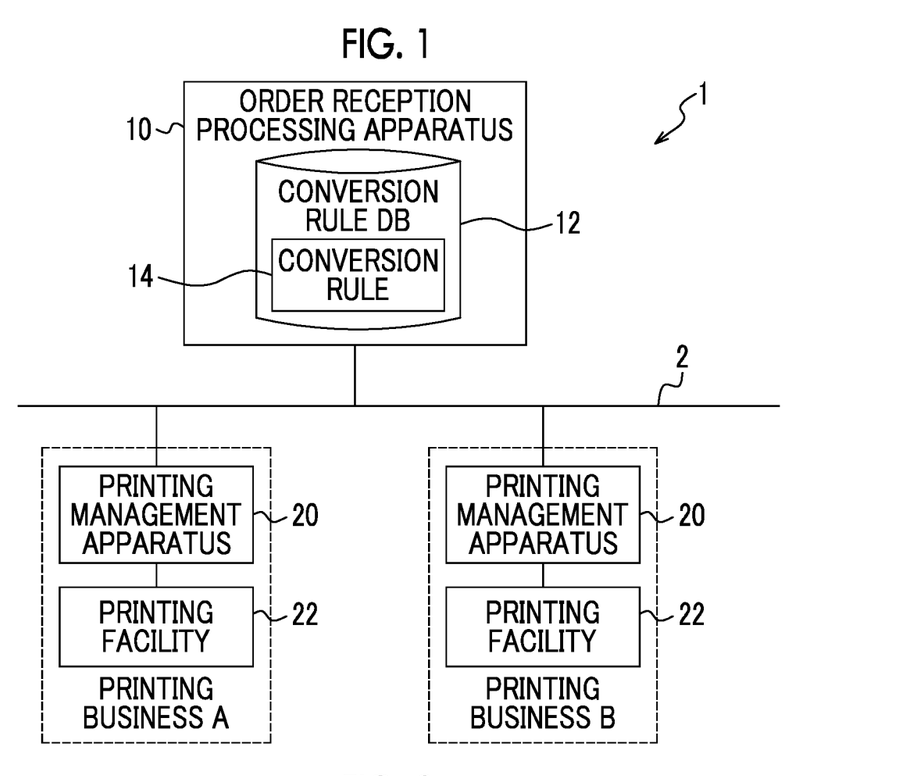
FIG. 1 is a diagram illustrating a configuration example of an order reception and placement system.

FIG. 1 is a diagram illustrating a configuration example of an article order reception and placement system 1 according to the present exemplary embodiment. Types of articles handled by the order reception and placement system 1 are not restricted, provided that manufacturing of the articles is started after orders are received. Accordingly, for example, an order of a component necessary for manufacturing any product may be received by the order reception and placement system 1. Hereinafter, the order reception and placement system 1 will be described using an example of performing printing by a printing business by receiving an order of a printed matter such as a book or a pamphlet.

As illustrated in FIG. 1, the order reception and placement system 1 includes an order reception processing apparatus 10, and also includes a printing management apparatus 20 and a printing facility 22 that are installed for each printing business. The order reception processing apparatus 10 and the printing management apparatus 20 of each printing business are connected through a communication line 2.

The order reception and placement system 1 is a system in which the order reception processing apparatus 10 receives information (hereinafter, referred to as "order reception information" related to printing of the printed matter input on a site (hereinafter, referred to as an "order reception site") for receiving a printing order, the order reception processing apparatus 10 transmits the order reception information to any of a plurality of printing businesses registered in advance in the order reception and placement system 1, and the printing business receiving the order reception information prints the printed matter ordered by a customer.

In a case where the order reception processing apparatus 10 receives the order reception information from the order reception site, the order reception processing apparatus 10 selects the printing business (hereinafter, referred to as a "designated printing business") for requesting printing of the printed matter based on a content of the order reception information, and transmits the order reception information to the printing management apparatus 20 of the designated printing business.

The order reception processing apparatus 10 includes a conversion rule DB 12. The conversion rule DB 12 stores a conversion rule 14. Here, "DB" is the abbreviation for database and provides data management functions such as storage of data, an update of data included inside the DB, and deletion of data.

The conversion rule 14 is conversion information for converting the content of the order reception information in accordance with a user using each apparatus, so that processing based on the order reception information is easily performed in each apparatus such as the order reception processing apparatus 10 and the printing management apparatus 20 that use the order reception information. Accordingly, an association between the order reception information on the printed matter and printing information used by each of the printing businesses printing the printed matter in accordance with the order reception information on the printed matter is prescribed in the conversion rule 14.

The printing information is unique information used in a company of the printing business in a course of printing the printed matter. The printing information includes not only information that is widely used for defining specifications of the printed matter among other printing businesses or customers ordering the printed matter, but also information used in each individual printing business, that is, information unique to the printing business.

The order reception processing apparatus 10 converts, using the conversion rule 14, the order reception information received from the order reception site into the printing information used by the designated printing business and transmits the printing information to the printing management apparatus 20 of the designated printing business through the communication line 2. The printing information is one example of manufacturing information used by a manufacturer in a course of manufacturing an article.

The printing management apparatus 20 is one example of a manufacturing management apparatus that manufactures and manages the printed matter by controlling the printing facility 22 to print the printed matter such that the printed matter of the received order is printed in accordance with the order reception information. For example, the printing management apparatus 20 and the printing facility 22 are connected through an intra-company local area network (LAN) of the printing business.

For example, the printing facility 22 includes a printer that performs printing on paper, a folder that folds the paper into a designated size, a binder that performs bookbinding by binding the paper, a cutter that cuts an unnecessary part of the paper, and a transporter that transports the printed matter.

While an example in which two companies of a printing business A and a printing business B are registered in the order reception and placement system 1 is illustrated in FIG. 1, the number of printing businesses registered in the order reception and placement system 1 is not restricted, and a plurality of printing businesses of three or more companies may be registered. For convenience of description, an example in which two companies of the printing business A and the printing business B are registered in the order reception and placement system 1 will be described.

In addition, the type of communication line 2 connecting the order reception processing apparatus 10 and the printing management apparatus 20 is not restricted. For example, the Internet or a VPN is used. The communication line 2 may be wired or wireless.

The order reception processing apparatus 10 and the printing management apparatus 20 are one example of an information processing apparatus according to the present exemplary embodiment. In addition, the printing business is one example of a manufacturer that manufactures an article such as the printed matter, and the designated printing business is one example of a designated manufacturer that actually manufactures the article in accordance with the order reception information.

The order reception processing apparatus 10 and the printing management apparatus 20 are configured using computers.

Figure 2:
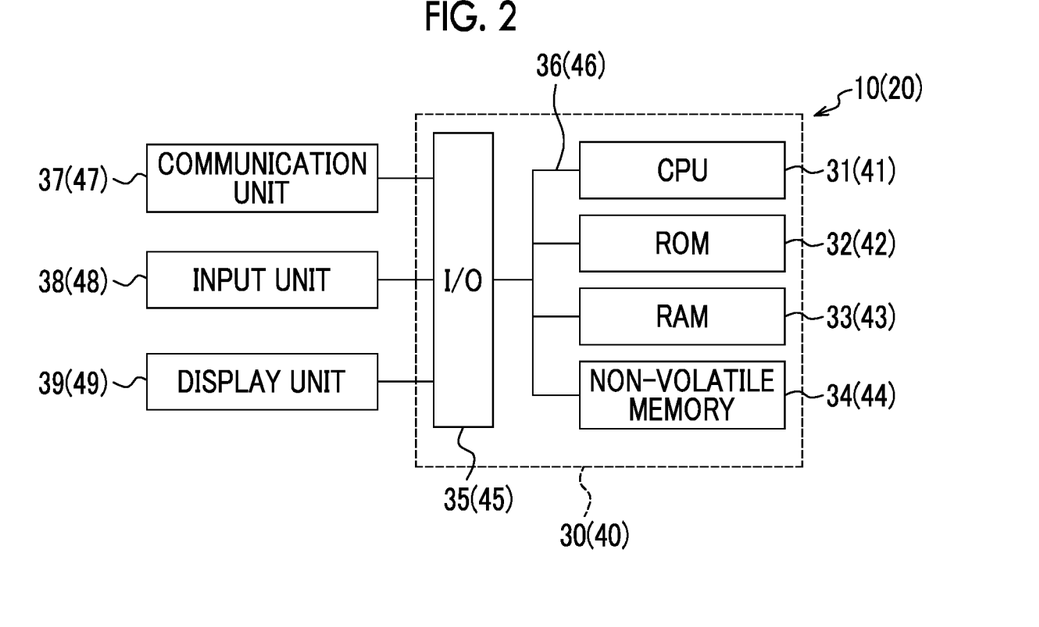
FIG. 2 is a diagram illustrating a basic configuration example of an electric system in an order reception processing apparatus and a printing management apparatus.

FIG. 2 is a diagram illustrating a basic configuration example of an electric system in the order reception processing apparatus 10 and the printing management apparatus 20. For example, the order reception processing apparatus 10 is configured using a computer 30. For example, the printing management apparatus 20 is configured using a computer 40.

The computer 30 includes a central processing unit (CPU) 31 that performs processing of the order reception processing apparatus 10, a read only memory (ROM) 32 that stores an information processing program, a random access memory (RAM) 33 that is used as a temporary work area of the CPU 31, a non-volatile memory 34, and an input-output interface (I/O) 35. The CPU 31, the ROM 32, the RAM 33, the non-volatile memory 34, and the I/O 35 are connected to each other through a bus 36.

The non-volatile memory 34 is one example of a storage device that maintains stored information even in a case where power supplied to the non-volatile memory 34 is stopped. For example, a semiconductor memory is used as the non-volatile memory 34. A hard disk may also be used. The non-volatile memory 34 may not necessarily be incorporated in the computer 30 and, for example, may be a storage device such as a memory card that is attached to and detached from the computer 30. In the non-volatile memory 34, for example, the conversion rule DB 12 is constructed, and the conversion rule 14 is stored.

For example, a communication unit 37, an input unit 38, and a display unit 39 are connected to the I/O 35.

The communication unit 37 is connected to the communication line 2 and includes a communication protocol for communicating with the printing management apparatus 20 of each printing business or an external apparatus not illustrated.

The input unit 38 is a device that receives an instruction from an operator and notifies the CPU 31. For example, a button, a touch panel, a keyboard, a pointing device, and a mouse are used as the input unit 38.

The display unit 39 is a device that outputs information processed by the CPU 31. For example, a display device such as a liquid crystal display, an organic electro luminescence (EL) display, and a projector that projects a video onto a screen are used as the display unit 39.

In the same manner as the computer 30, the computer 40 constituting the printing management apparatus 20 includes a CPU 41, a ROM 42, a RAM 43, a non-volatile memory 44, and an I/O 45. The CPU 41, the ROM 42, the RAM 43, the non-volatile memory 44, and the I/O 45 are connected to each other through a bus 46. In addition, for example, a communication unit 47, an input unit 48, and a display unit 49 are connected to the I/O 45.

The communication unit 47 is connected to the communication line 2 and includes a communication protocol for communicating with the order reception processing apparatus 10 or the external apparatus not illustrated.

The input unit 48 is a device that receives an instruction from an operator and notifies the CPU 41. For example, a button, a touch panel, a keyboard, a pointing device, and a mouse are used as the input unit 48.

The display unit 49 is a device that outputs information processed by the CPU 41. For example, a display device such as a liquid crystal display, an organic EL display, and a projector that projects a video onto a screen are used as the display unit 49.

In the computer 30 and the computer 40, the input units 38 and 48 and the display units 39 and 49 are not necessarily included units and may be detached depending on a usage situation.

Next, processing of the order reception and placement system 1 will be described based on an operation of converting the order reception information using the conversion rule 14.

Figure 3:
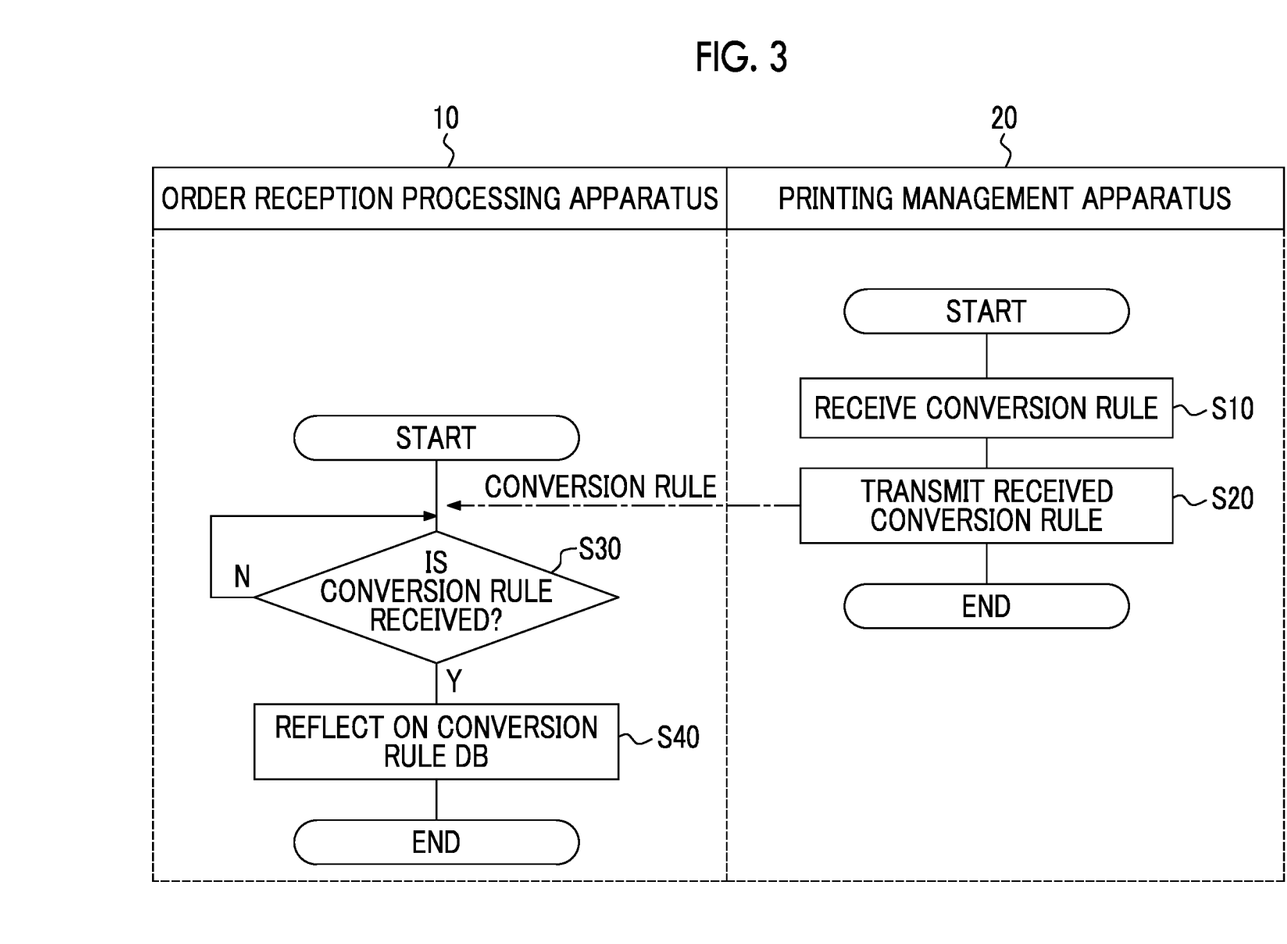
FIG. 3 is a flowchart illustrating one example of a flow of registration processing.

FIG. 3 is a flowchart illustrating one example of a flow of registration processing of the conversion rule 14 that, in a case where the printing businesses are registered in the order reception and placement system 1, is executed at least once by cooperation between the CPU 31 of the order reception processing apparatus 10 and the CPU 41 of the printing management apparatus 20 before reception of the order of the printed matter is started on the order reception site.

For example, the information processing program that prescribes the registration processing is stored in advance in each of the ROM 32 of the order reception processing apparatus 10 and the ROM 42 of the printing management apparatus 20. The CPU 31 of the order reception processing apparatus executes the registration processing by reading the information processing program stored in the ROM 32. In addition, the CPU 41 of the printing management apparatus 20 executes the registration processing by reading the information processing program stored in the ROM 42.

While an example in which the printing information used in the company of the printing business A is registered in the order reception and placement system 1 is illustratively described, the registration processing illustrated in FIG. 3 is performed for each of the other printing businesses registered in the order reception and placement system 1.

First, in step S10, the CPU 41 of the printing management apparatus 20 receives, from the printing business, the conversion rule 14 in which items of the order reception information are associated with the printing information. For example, the conversion rule 14 is input into the printing management apparatus 20 by associating the items of the order reception information with the printing information through registration screens 24A, 24B, 24C, and 24D displayed on the display unit 49.

Figure 4:
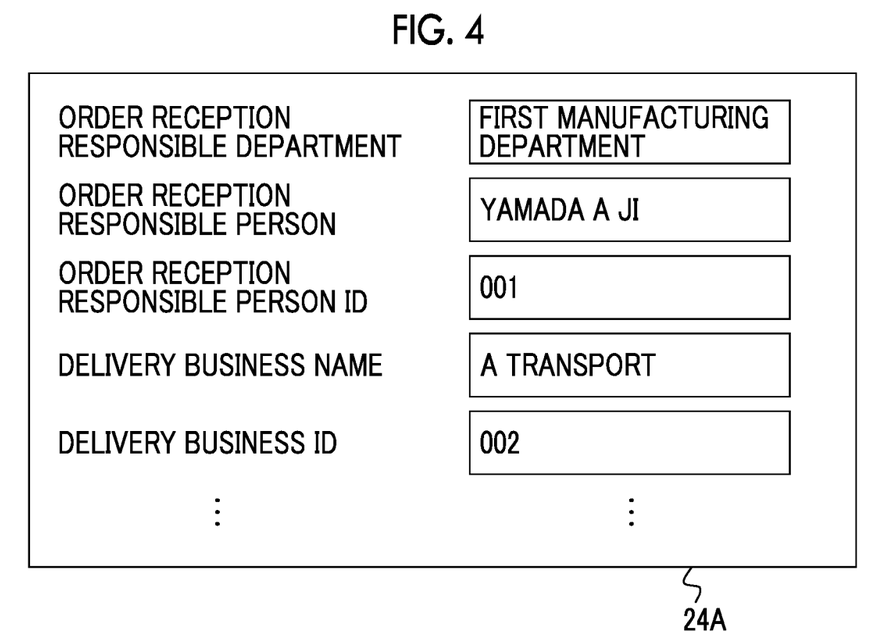
FIG. 4 is a diagram illustrating one example of a registration screen.

FIG. 4 is a diagram illustrating one example of the registration screen 24A. The registration screen 24A is a screen for registering business matters inside the printing business A in a case where the printing business A becomes the designated printing business of the printed matter ordered from the customer.

For example, a department that is responsible for printing the printed matter of the received order is registered in an "order reception responsible department". A name of a responsible person who is a contact for various inquiries related to the printed matter of the received order is registered in an "order reception responsible person". An identification number such as an employee number for identifying the responsible person is registered in an "order reception responsible person ID". In addition, a name of a delivery business that is responsible for delivering the completed printed matter is registered in a "delivery business name". An identification number for identifying the delivery business is registered in a "delivery business ID". ID is the abbreviation for "identifier" that means a discriminator.

The business matters inside the printing business A to be registered on the registration screen 24A are information not necessary for the customer to order the printed matter, and thus, are information not displayed on the order reception site.

Figure 5:
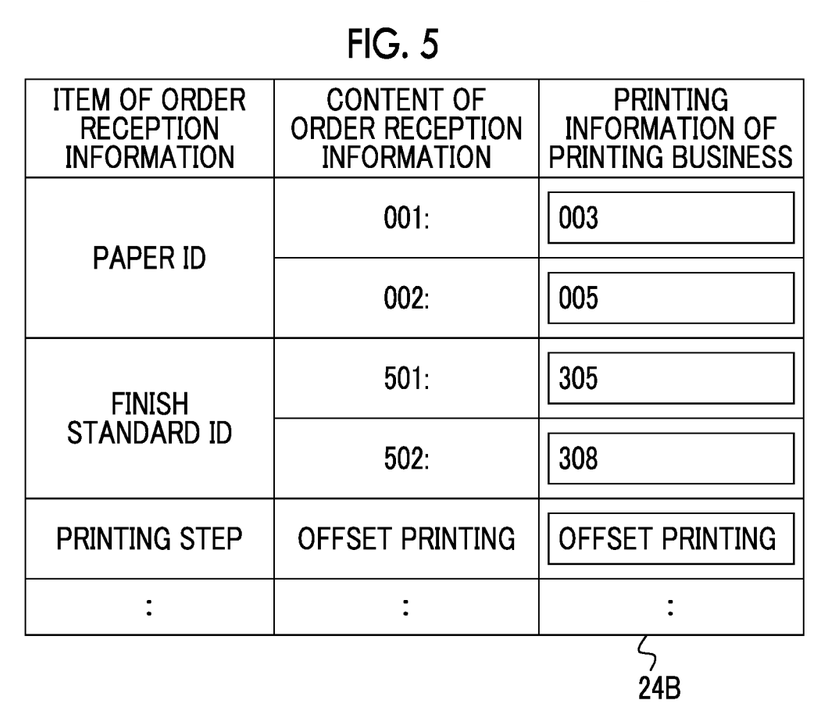
FIG. 5 is a diagram illustrating another example of the registration screen.

FIG. 5 is a diagram illustrating one example of the registration screen 24B. The registration screen 24B is a screen for registering the printing information corresponding to the specifications of the printed matter designated by the customer on the order reception site.

For example, the customer designates paper to be used for the printed matter to be ordered, by selecting a paper ID corresponding to each of different types of paper. In this case, the paper ID of paper used on the order reception site may be different from the paper ID used by the printing business A for the paper. Accordingly, the printing business A associates the paper ID used inside the printing business A with the paper ID used on the order reception site through the registration screen 24B.

The specifications of the printed matter designated by the customer on the order reception site are reflected on the order reception information. That is, the items of the order reception information include an item such as "paper ID" as a designation target of the specifications of the printed matter for the customer. Information such as "001" that is designated by the customer for the item as the designation target of the specifications is set as a content of the order reception information. Meanwhile, in the example of the registration screen 24B in FIG. 5, a paper ID "003" that is used inside the printing business A is associated.

Similarly, for the other items of the order reception information such as a "finish standard ID" on which the specifications designated by the customer on the order reception site are reflected, contents set in the order reception information are associated with the printing information used inside the printing business A through the registration screen 24B. Here, "finish standard ID" is an identification number for designating a treatment finish of the printed matter.

On the registration screen 24B, association is performed not only in a case where the contents set in the order reception information are different from the printing information used inside the printing business A, but also in a case where the contents are identical to the printing information. For example, in a case where "offset printing" can be designated as a printing step intended by the customer on the order reception site, and where this printing is also referred to as "offset printing" inside the printing business A, "offset printing" is input into a field in which the printing information of the printing business on "printing step" of the registration screen 24B is input.

Figure 6:
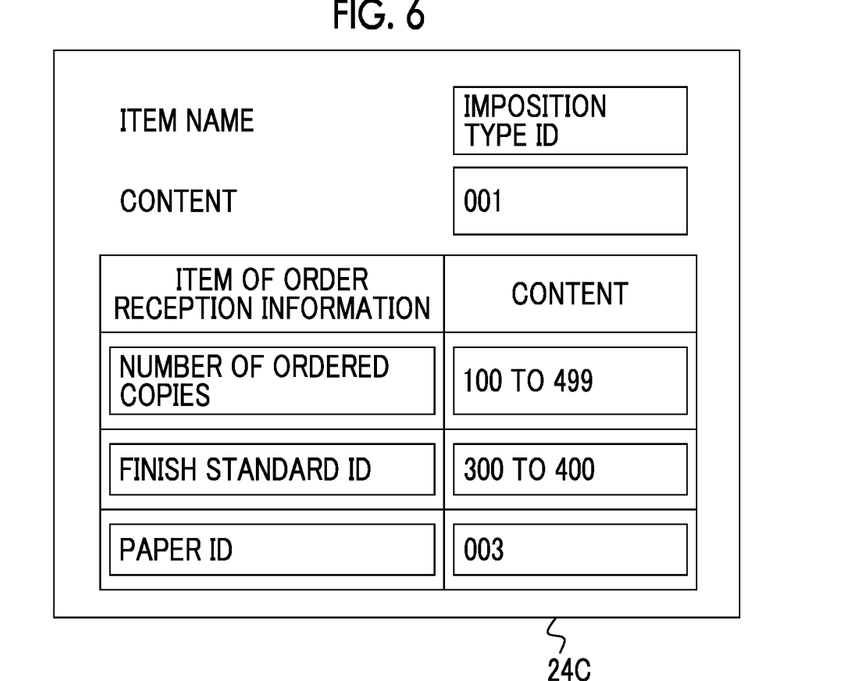
FIG. 6 is a diagram illustrating another example of the registration screen.

FIG. 6 is a diagram illustrating one example of the registration screen 24C. The registration screen 24C is a screen for associating the printing information used inside the printing business A with the items of the order reception information on which the specifications designated by the customer on the order reception site are reflected.

For example, in the printing business A, an imposition type of the printed matter is assumed to be uniquely decided by a combination of "number of ordered copies", "finish standard ID", and "paper ID". In this case, in the printing business A, the imposition type of the ordered printed matter can be specified by referring to the content of each item of "number of ordered copies", "finish standard ID", and "paper ID" set in the order reception information. However, in a case where an imposition type ID that represents the imposition type is set in advance in the order reception information, an effort of specifying the imposition type of the printed matter from the content of each item of "number of ordered copies", "finish standard ID", and "paper ID" is not required, and mistakes are more unlikely to occur than in a case of manually specifying the imposition type of the printed matter from the content of each item of "number of ordered copies", "finish standard ID", and "paper ID".

Accordingly, an item "imposition type ID" is set in advance in the order reception information, and the content of each item of "number of ordered copies", "finish standard ID", and "paper ID" of the order reception information is associated with a content of "imposition type ID". In a case of the example illustrated in FIG. 6, the content "001" is associated with the item "imposition type ID" included in the order reception information in a case where an order of a printed matter with the item "number of ordered copies" of "100 to 499", the item "finish standard ID" of "300 to 400", and the item "paper ID" of "003" is received.

In such a manner, the items of the referred order reception information and each content of the referred order reception information are associated with each imposition type ID used by the printing business A on the registration screen 24C.

An item of the order reception information represented by an item name field of the registration screen 24C is information not necessary for the customer to order the printed matter, and thus, is an item not displayed on the order reception site. Accordingly, the customer does not set the content of the item.

While three items of "number of ordered copies", "finish standard ID", and "paper ID" of the order reception information are associated with the imposition type ID in the example of the registration screen 24C illustrated in FIG. 6, the number of items of the order reception information associated with the item of the order reception information represented by the item name field of the registration screen 24C is not restricted. One or more items of the order reception information can be associated with the item of the order reception information represented by the item name field of the registration screen 24C. Apparently, the printing business A can associate, on the registration screen 24C, an item of the order reception information having a content set by the customer with each of the other items of the order reception information other than the imposition type ID used inside the printing business A.

Figure 7:
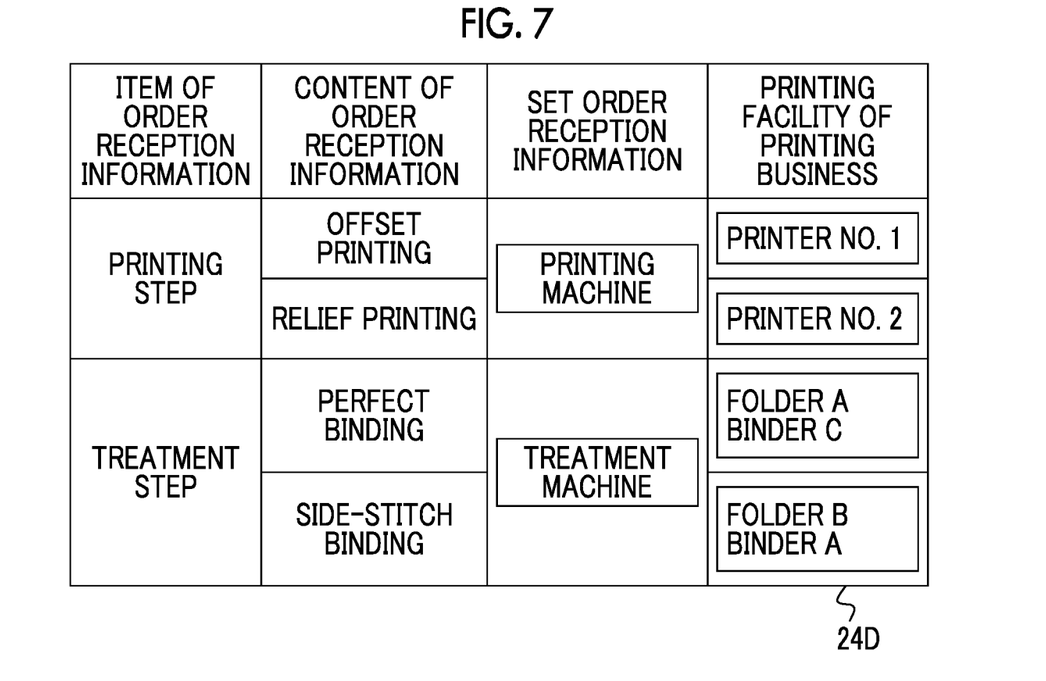
FIG. 7 is a diagram illustrating another example of the registration screen.

FIG. 7 is a diagram illustrating one example of the registration screen 24D. The registration screen 24D is a screen for associating, with each content in the items of the referred order reception information, the printing facility 22 used by the printing business A in a case where the content is designated.

In a case of the example of the registration screen 24D illustrated in FIG. 7, a case where a content of the item "printing step" in the order reception information is "offset printing" is associated with printing of the printed matter of the received order using a "printer No. 1" by the printing business A. A case where the content of the item "printing step" in the order reception information is "relief printing" is associated with printing of the printed matter of the received order using a "printer No. 2" by the printing business A. In addition, a case where a content of an item "treatment step" in the order reception information is "perfect binding" is associated with treatment of the printed matter of the received order using a "folder A" and a "binder C" by the printing business A. A case where the content of the item "treatment step" in the order reception information is "side-stitch binding" is associated with treatment of the printed matter of the received order using a "folder B" and a "binder A" by the printing business A.

In addition, a content set in a printing facility field of the printing business is associated with an item of the order reception information set in a set order reception information field, by setting the item of the order reception information in the set order reception information field. That is, in a case of the example of the registration screen 24D illustrated in FIG. 7, "printer No. 1" or "printer No. 2" is associated with an item "printing machine" in the order reception information, and a combination of "folder A" and "binder C" or a combination of "folder B" and "binder A" is associated with an item "treatment machine" in the order reception information.

The item of the order reception information set in the set order reception information field of the registration screen 24D is information not necessary for the customer to order the printed matter, and thus, is an item not displayed on the order reception site. Accordingly, the customer does not set the content of the item.

In such a manner, the order reception information includes not only items such as "order reception responsible person", "paper ID", and "imposition type ID" associated with printing attribute information that is information related to characteristics of the printed matter or information related to management of the printed matter, but also items such as "printing step", "treatment step", "printing machine", and "treatment machine" associated with printing step information that is information related to a printing method of the printed matter or information related to the printing facility 22 used for printing. The printing step is one example of a manufacturing step representing a difference in manufacturing method of the article, and the printing facility 22 is one example of a manufacturing facility used for manufacturing the article.

The registration screens 24A to 24D illustrated in FIG. 4 to FIG. 7 are one example, and screen configurations and input methods are not restricted, provided that the items of the order reception information can be associated with the printing information of the printing business.

In step S10 in FIG. 3, in a case where the conversion rule 14 is received through the registration screens 24A to 24D, the CPU 41 of the printing management apparatus 20 in step S20 transmits the conversion rule 14 received in step S10 to the order reception processing apparatus 10 and finishes the registration processing on the printing management apparatus 20 side illustrated in FIG. 3.

Meanwhile, in step S30, the CPU 31 of the order reception processing apparatus 10 performs processing of determining whether or not the conversion rule 14 is received from the printing management apparatus 20. In a case where the conversion rule 14 is not received, determination processing in step S30 is repeatedly executed until the conversion rule 14 is received from the printing management apparatus 20. In a case where the conversion rule 14 is received from the printing management apparatus 20, a transition is made to step S40.

In step S40, the CPU 31 stores the conversion rule 14 received from the printing management apparatus 20 in the conversion rule DB 12 and finishes the registration processing on the order reception processing apparatus 10 side illustrated in FIG. 3.

Figure 8:
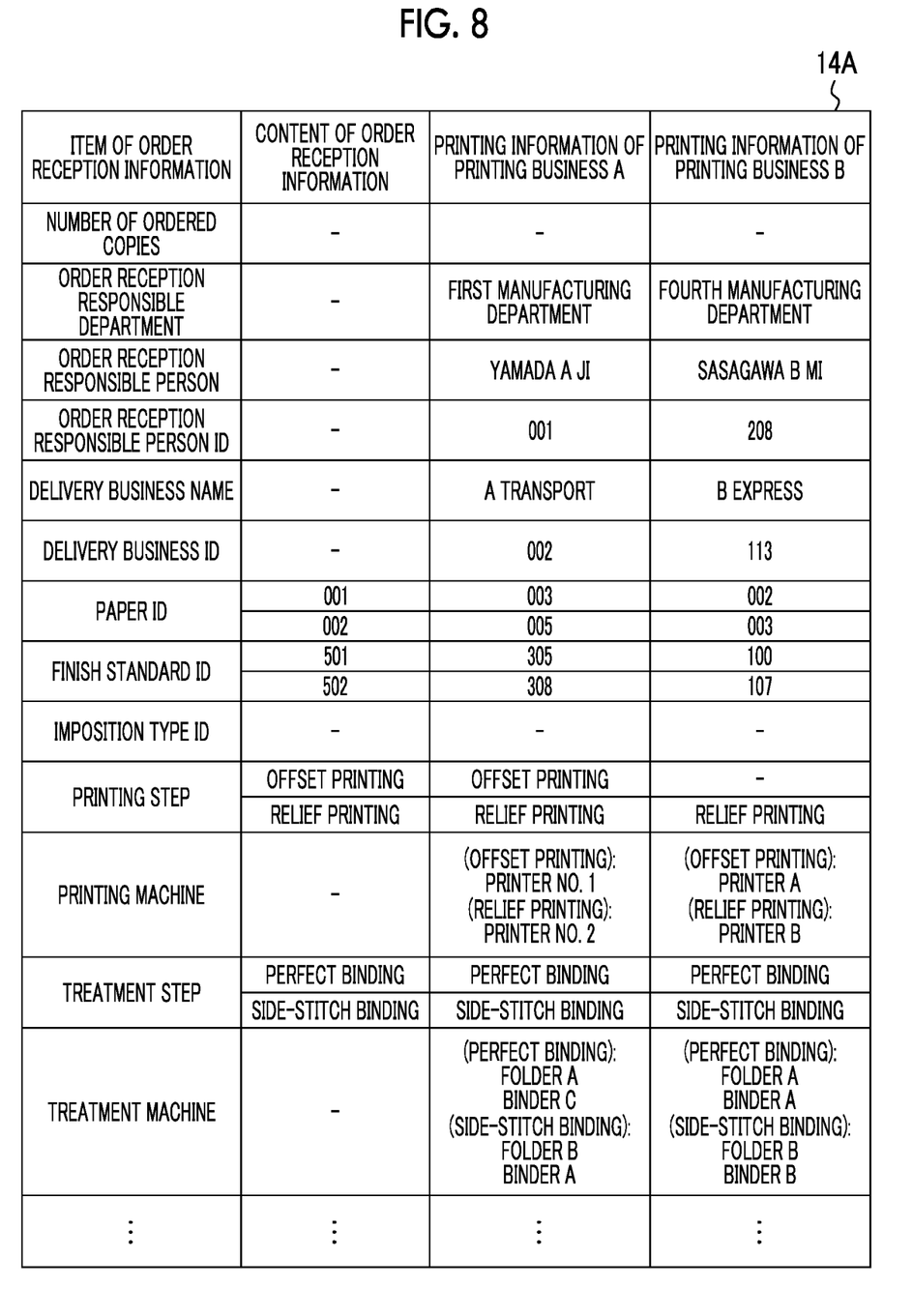
FIG. 8 is a diagram illustrating one example of a conversion rule.
Figure 9:
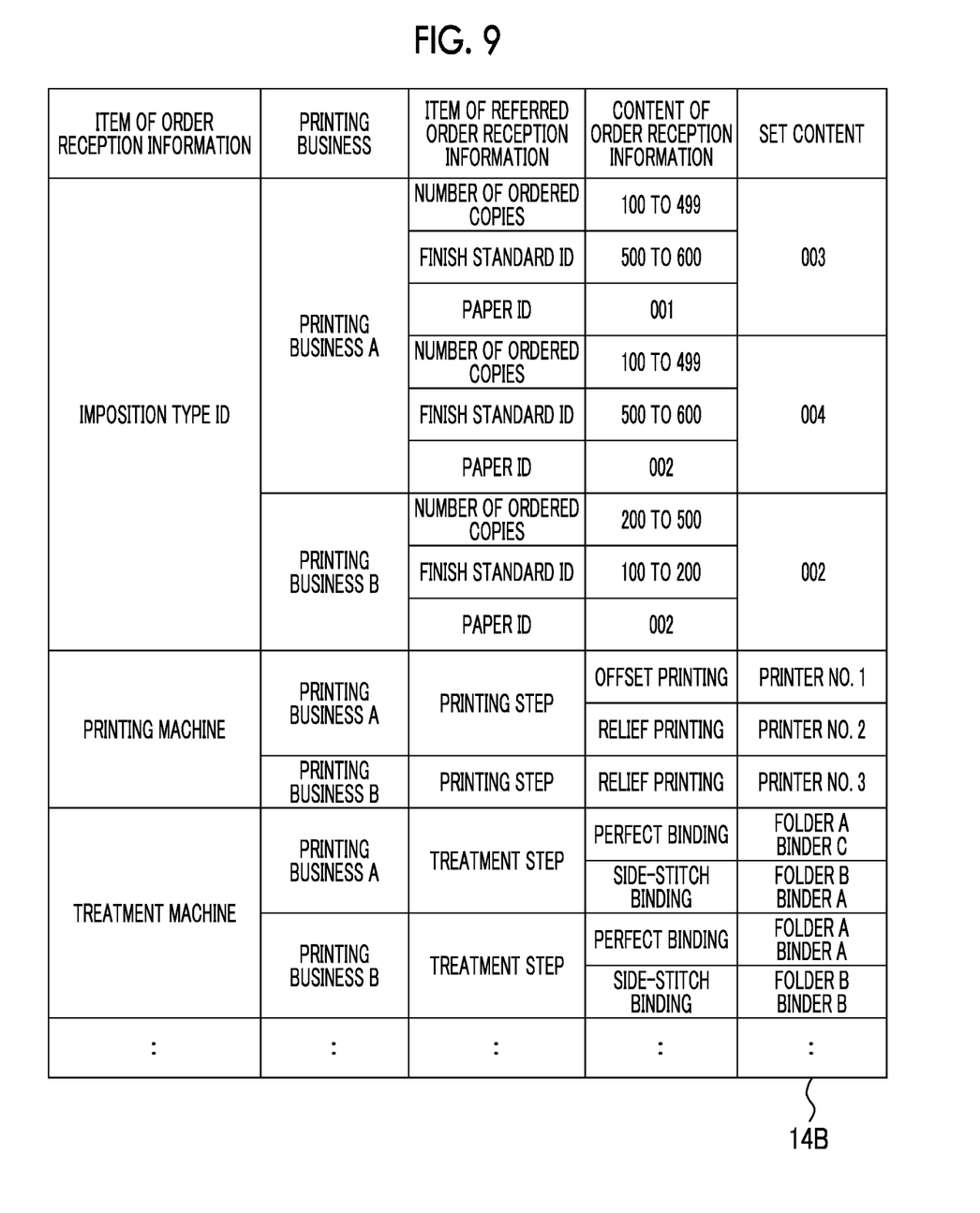
FIG. 9 is a diagram illustrating another example of the conversion rule.

FIG. 8 and FIG. 9 are diagrams illustrating one example of the conversion rule 14 stored in the conversion rule DB 12. In the conversion rule DB 12, for example, the conversion rule 14 is configured with a first conversion rule 14A and a second conversion rule 14B. In FIG. 8 and FIG. 9, a symbol "-" in a cell represents that any information is not set in the cell.

The first conversion rule 14A is the conversion rule 14 in which the items of the order reception information are associated one-to-one with the printing information of each printing business. Among the items of the order reception information in the first conversion rule 14A, for example, an item such as "number of ordered copies" of which a content can be freely designated by the customer does not have a confirmed content until the order is received from the customer, and thus, is not associated with the printing information.

In the order reception information, an item such as "order reception responsible department" that is registered on the registration screen 24A in FIG. 4 and represents the business matters inside the printing business is an item not displayed on the order reception site, and thus, is not designated by the customer. Accordingly, a content is not set in the item of the order reception information related to the business matters inside the printing business.

In addition, in the order reception information, an item such as "printing machine" or "treatment machine" that is registered on the registration screen 24D in FIG. 7 and related to the printing facility 22 used by the printing business is an item not displayed on the order reception site, and thus, is not designated by the customer. Accordingly, a content is not set in the item of the order reception information related to the printing facility 22.

Furthermore, in the order reception information, an item such as "imposition type ID" that is registered on the registration screen 24C in FIG. 6 and of which a content is set based on the other contents of the order reception information is an item not displayed on the order reception site, and thus, is not designated by the customer. Accordingly, a content is not set in the item of the order reception information of which the content is set based on the other contents of the order reception information.

Like the item of the order reception information related to the printing facility 22 (for example, the item of the set order reception information field in the registration screen 24D in FIG. 7) and the item of the order reception information of which the content is set based on the contents of the other items of the order reception information (for example, the item set in the item name field in the registration screen 24C in FIG. 6), an item of the order reception information of which a content is decided by the contents in the items of the referred order reception information will be referred to as a "secondary item" of the order reception information.

The second conversion rule 14B illustrated in FIG. 9 is the conversion rule 14 in which the content set in the secondary item of the order reception information is associated with each printing business based on the items and the contents of the referred order reception information with respect to the secondary item of the order reception information. That is, the second conversion rule 14B is the conversion rule 14 in which the conversion rule 14 registered through the registration screen 24C in FIG. 6 and the conversion rule 14 registered through the registration screen 24D in FIG. 7 are summarized for each printing business.

By processing of step S40 in FIG. 3, the first conversion rule 14A illustrated in FIG. 8 and the second conversion rule 14B illustrated in FIG. 9 are stored in the conversion rule DB 12 of the order reception processing apparatus 10. The conversion rule 14 is obtained by combining the first conversion rule 14A with the second conversion rule 14B.

While the conversion rule 14 is illustratively configured with the first conversion rule 14A and the second conversion rule 14B, a data structure of the conversion rule 14 is not restricted. The conversion rule 14 may have any data structure, provided that the order reception information used on the order reception site can be associated with the printing information of each printing business registered in the order reception and placement system 1.

The registration processing illustrated in FIG. 3 is executed by the printing business each time the association between the order reception information and the printing information used by the printing business is changed. Accordingly, the conversion rule 14 after update, that is, the conversion rule 14 in which the order reception information and the printing information are correctly associated, is stored in the conversion rule DB 12.

Next, an operation of the order reception and placement system 1 executed in a case where the customer designates the specifications of the printed matter of the order placed through the order reception site and pushes a completion button displayed on an order reception screen of the order reception site will be described.

Figure 10:
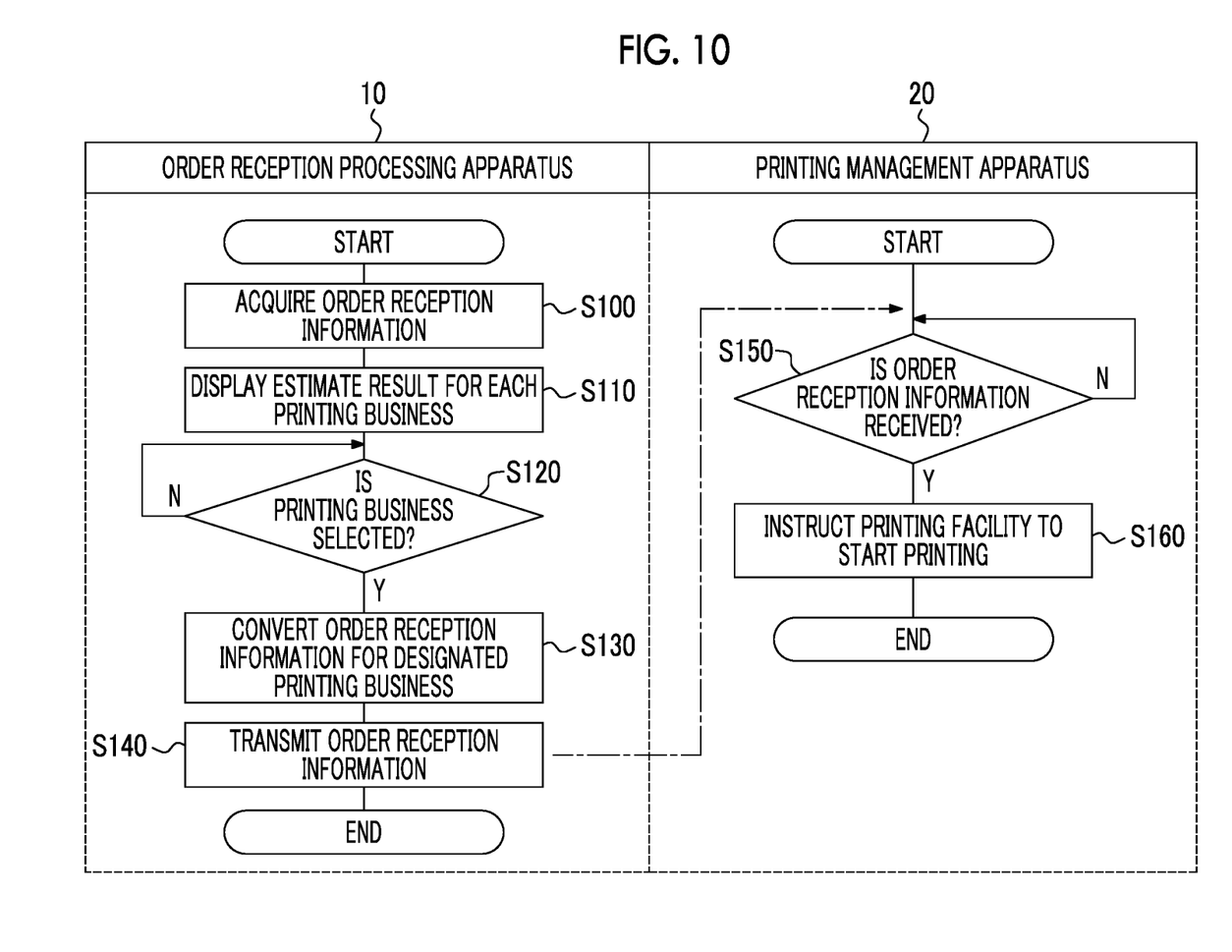
FIG. 10 is a flowchart illustrating one example of a flow of order reception processing.

FIG. 10 is a flowchart illustrating one example of a flow of order reception processing executed by the CPU 31 of the order reception processing apparatus 10 and the CPU 41 of the printing management apparatus 20 in a case where the customer pushes the completion button displayed on the order reception screen of the order reception site, and where the order reception information on the printed matter is transmitted to the order reception processing apparatus 10 through the communication line 2. The order reception processing is also prescribed by the information processing program in the same manner as the registration processing illustrated in FIG. 3. That is, the CPU 31 of the order reception processing apparatus 10 executes the order reception processing by reading the information processing program stored in the ROM 32. In addition, the CPU 41 of the printing management apparatus 20 executes the order reception processing by reading the information processing program stored in the ROM 42.

In step S100, the CPU 31 of the order reception processing apparatus 10 acquires the order reception information on the printed matter from the order reception site and stores the order reception information in the RAM 33.

Figure 11:
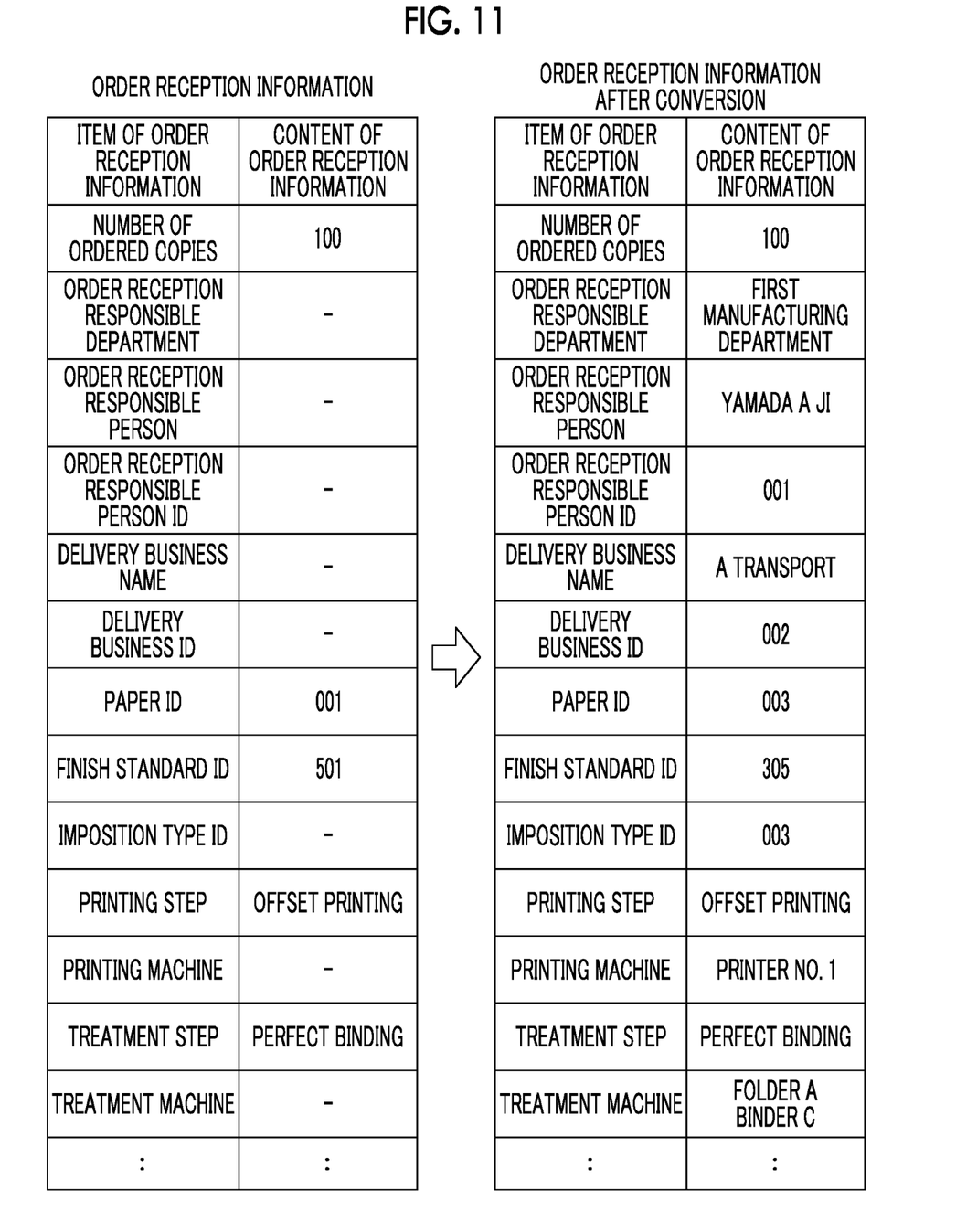
FIG. 11 is a diagram illustrating one example of order reception information acquired from an order reception site and the order reception information after conversion that is converted in accordance with the conversion rule.

FIG. 11 is a diagram illustrating one example of the order reception information acquired from the order reception site and the order reception information after conversion into which the order reception information acquired from the order reception site is converted in accordance with the conversion rule 14 as will be described later.

The items of the order reception information include not only the items set by the customer on the order reception site but also the business matters inside the printing business, the printing step information, and the secondary item of the order reception information. Accordingly, in the order reception information acquired from the order reception site, contents are set in only the items set by the customer on the order reception site. In FIG. 11, the symbol "-" in a field of the content of the order reception information represents that a content is not set in the corresponding item of the order reception information.

In step S110, for each printing business registered in the order reception and placement system 1, the CPU 31 calculates an estimate for the order of the printed matter placed by the customer using the conversion rule 14 and displays a calculated estimate result on the order reception screen of the order reception site.

For example, in a case where the customer designates "offset printing" as the printing step, the CPU 31 searches for "printing step" from a field of the item of the order reception information of the conversion rule 14 and refers to the printing information of each printing business associated with "offset printing" in a field of the content of the order reception information. The example of the first conversion rule 14A in FIG. 8 indicates that the printing business A can provide the offset printing, and that the printing business B does not provide the offset printing. In such a manner, for each printing business, the CPU 31 checks, using the conversion rule 14, whether or not the printing information corresponding to the contents set by the customer is associated for each item of the order reception information of which the content is set by the customer, and extracts the printing business that can print the printed matter in accordance with the content of each item of the order reception information set by the customer.

Then, the CPU 31 calculates the estimate result including a due date and a price of the printed matter for each printing business capable of handling printing of the printed matter of the order placed by the customer. Specifically, in a case where each printing business registers the due date and the price in advance in the conversion rule 14 as the secondary item that refers to the items of the order reception information such as "number of ordered copies", "finish standard ID", "printing step", and "treatment step" affecting the due date and the price of the printed matter, the CPU 31 can calculate, using the conversion rule 14, the estimate result of each printing business capable of handling printing of the printed matter of the order placed by the customer.

In step S120, the CPU 31 determines whether or not the customer selects any one printing business from printing businesses of which the estimate results are displayed on the order reception site. In a case where the printing business is not selected, a situation where the customer selects the printing business is monitored by repeatedly executing determination processing in step S120. Meanwhile, in a case where the printing business is selected, a transition is made to step S130. The printing business selected by the customer becomes the designated printing business. The printing business A is assumed to be selected as the designated printing business.

In step S130, the CPU 31 converts the content of each item of the order reception information into the printing information of the designated printing business associated with the item of the order reception information using the conversion rule 14.

Specifically, the CPU 31 converts set contents in the items of the order reception information set by the customer on the order reception site into the printing information of the designated printing business associated with the items of the order reception information using the conversion rule 14.

For example, as illustrated in FIG. 11, in a case where "001" is set in the item "paper ID" of the order reception information, "003" is associated with the paper ID "001" for the printing business A in the first conversion rule 14A in FIG. 8. Accordingly, the CPU 31 converts the content of the item "paper ID" in the order reception information from "001" into "003".

Similarly, in a case where the customer sets "501" as the content of the item "finish standard ID" as illustrated in FIG. 11, "305" is associated with the finish standard ID "501" for the printing business A in the first conversion rule 14A in FIG. 8. Accordingly, the CPU 31 converts the content of the item "finish standard ID" in the order reception information from "501" into "305".

In the example of the order reception information illustrated in FIG. 11, "offset printing" is set in the content of the item "printing step". In the first conversion rule 14A in FIG. 8, an identical expression "offset printing" is associated with "offset printing" indicating the content of the item "printing step" of the order reception information for the printing business A. For such an item of the order reception information, the CPU 31 apparently does not need to convert the content of the item of the order reception information set by the customer on the order reception site into the printing information of the printing business A. Accordingly, "perfect binding" in the content of the item "treatment step" in the order reception information illustrated in FIG. 11 is not changed.

In addition, for items of the order reception information of which contents are not set by the customer, the CPU 31 performs, using the conversion rule 14, conversion of setting the printing information of the designated printing business associated with the items of the order reception information.

For example, in the order reception information illustrated in FIG. 11, each item of "order reception responsible department", "order reception responsible person", "order reception responsible person ID", "delivery business name", and "delivery business ID" is an item of which a content is not set by the customer, and is an item associated with the printing information of the printing business A in the first conversion rule 14A illustrated in FIG. 8. Accordingly, the CPU 31 sets "first manufacturing department", "Yamada A Ji", "001", "A transport", and "002" in the items "order reception responsible department", "order reception responsible person", "order reception responsible person ID", "delivery business name", and "delivery business ID" of the order reception information illustrated in FIG. 11, respectively. That is, the CPU 31 complements the order reception information by setting the printing information individually used by the designated printing business in the item of the order reception information not set by the customer. Such processing of setting the printing information of the designated printing business in the item of the order reception information of which the content is not set is also one example of processing of converting the contents of the item of the order reception information into the printing information of the designated printing business.

In addition, for the secondary item of the order reception information of which the content is not set by the customer, the CPU 31 performs, using the conversion rule 14, conversion of setting the printing information of the designated printing business associated with the items of the set contents of the order reception information which is referred to for the secondary item.

For example, in the order reception information illustrated in FIG. 11, "printing machine" is the secondary item. According, the CPU 31 refers to the content of "printing step" which is a referred item of "printing machine" in accordance with the second conversion rule 14B. In the example of the order reception information illustrated in FIG. 11, "offset printing" is set as the content of "printing step". Thus, the CPU 31 sets the printing information of the printing business A, that is, "printer No. 1", in the item "printing machine" in accordance with the second conversion rule 14B.

In the order reception information illustrated in FIG. 11, "treatment machine" is also the secondary item. According, the CPU 31 refers to the content of "treatment step" which is a referred item of "treatment machine" in accordance with the second conversion rule 14B. In the example of the order reception information illustrated in FIG. 11, "perfect binding" is set as the content of "treatment step". Thus, the CPU 31 sets the printing information of the printing business A, that is, "folder A" and "binder C", in the item "treatment machine" in accordance with the second conversion rule 14B.

In the order reception information illustrated in FIG. 11, "imposition type ID" is also the secondary item. Accordingly, the CPU 31 refers to the contents of "number of ordered copies", "finish standard ID", and "paper ID" which are referred items of "imposition type ID" in accordance with the second conversion rule 14B. In the example of the order reception information illustrated in FIG. 11, "100" is set as the content of "number of ordered copies", "501" is set as the content of "finish standard ID", and "001" is set as the content of "paper ID". Thus, the CPU 31 sets the printing information of the printing business A, that is, "003", for which a combination of the contents of "number of ordered copies", "finish standard ID", and "paper ID" satisfies a condition set in the field of the content of the order reception information, in the item "imposition type ID" in accordance with the second conversion rule 14B.

In such a manner, the CPU 31 generates, using the conversion rule 14, the order reception information, that is, the order reception information after conversion, in which the items of the order reception information illustrated in FIG. 11 are converted into the printing information of the designated printing business. The order reception information after conversion is associated with not only the printing attribute information of the printed matter of the received order but also the printing step information of the designated printing business. In the order reception information illustrated in FIG. 11, each item of "number of ordered copies" to "imposition type ID" is the printing attribute information, and each item of "printing step" to "treatment machine" is the printing step information.

After the order reception information is changed, in step S140 in FIG. 10, the CPU 31 transmits the order reception information after conversion to the printing management apparatus 20 of the designated printing business through the communication line 2 and finishes the order reception processing on the order reception processing apparatus 10 side.

Meanwhile, in step S150, the CPU 41 of the printing management apparatus 20 of the designated printing business performs processing of determining whether or not the order reception information is acquired from the order reception processing apparatus 10. In a case where the order reception information is not received, a situation where the order reception information is received is monitored by repeatedly executing determination processing in step S150 until the order reception information is received from the order reception processing apparatus 10. In a case where the order reception information is received from the order reception processing apparatus 10, a transition is made to step S160. The order reception information received by the printing management apparatus 20 from the order reception processing apparatus 10 is the order reception information after conversion as illustrated in FIG. 11.

In step S160, in accordance with the order reception information received from the order reception processing apparatus 10, the CPU 41 performs printing preparation by setting various printing attribute information designated in the order reception information for the printing facility 22 designated in the items "printing machine" and "treatment machine" of the order reception information, and then, starts printing. In addition, in accordance with the order reception information, the CPU 41 contacts the responsible person designated in the item "order reception responsible person" for the received order by mail or social networking service (SNS) and arranges delivery of the printed matter with the delivery business designated in the item "delivery business name". Accordingly, the order reception processing on the printing management apparatus 20 side is finished.

In such a manner, in the order reception information received by the printing management apparatus 20 from the order reception processing apparatus 10, the contents of the items of the order reception information set by the customer are converted into the printing information of the printing business, and the printing step information unique to each printing business is also included. Accordingly, the CPU 41 may control the printing facility 22 and manage order reception of the printed matter by using the content set in each item of the order reception information.

In the conversion rule 14, the printing information used by each of the plurality of printing businesses registered in the order reception and placement system 1 is associated with the content of each item of the order reception information. Accordingly, in a case of causing the customer to designate the printing information related to the specifications of the printed matter for each item of the order reception information, the order reception processing apparatus 10 does not display the printing information in which expressions unique to each printing business are used, on the order reception site. The order reception processing apparatus 10 converts the content of each item into a common expression so that the content is easily understood by the customer, and then, displays the converted content on the order reception screen of the order reception site. For example, the order reception processing apparatus 10 can display the paper IDs of paper represented as "003" by the printing business A and "002" by the printing business B uniformly as the content represented as "001" by the order reception site on the order reception screen of the order reception site in accordance with the first conversion rule 14A in FIG. 8.

Up to this point, the order reception processing apparatus 10 converts the contents of the items of the order reception information set by the customer on the order reception site into the printing information of the designated printing business using the conversion rule 14. However, an entity that converts the order reception information does not necessarily be the order reception processing apparatus 10. The printing management apparatus 20 may convert the contents of the items of the order reception information into the printing information that is used in the printing business of the printing management apparatus 20 and is unique to the printing business.

Figure 12:
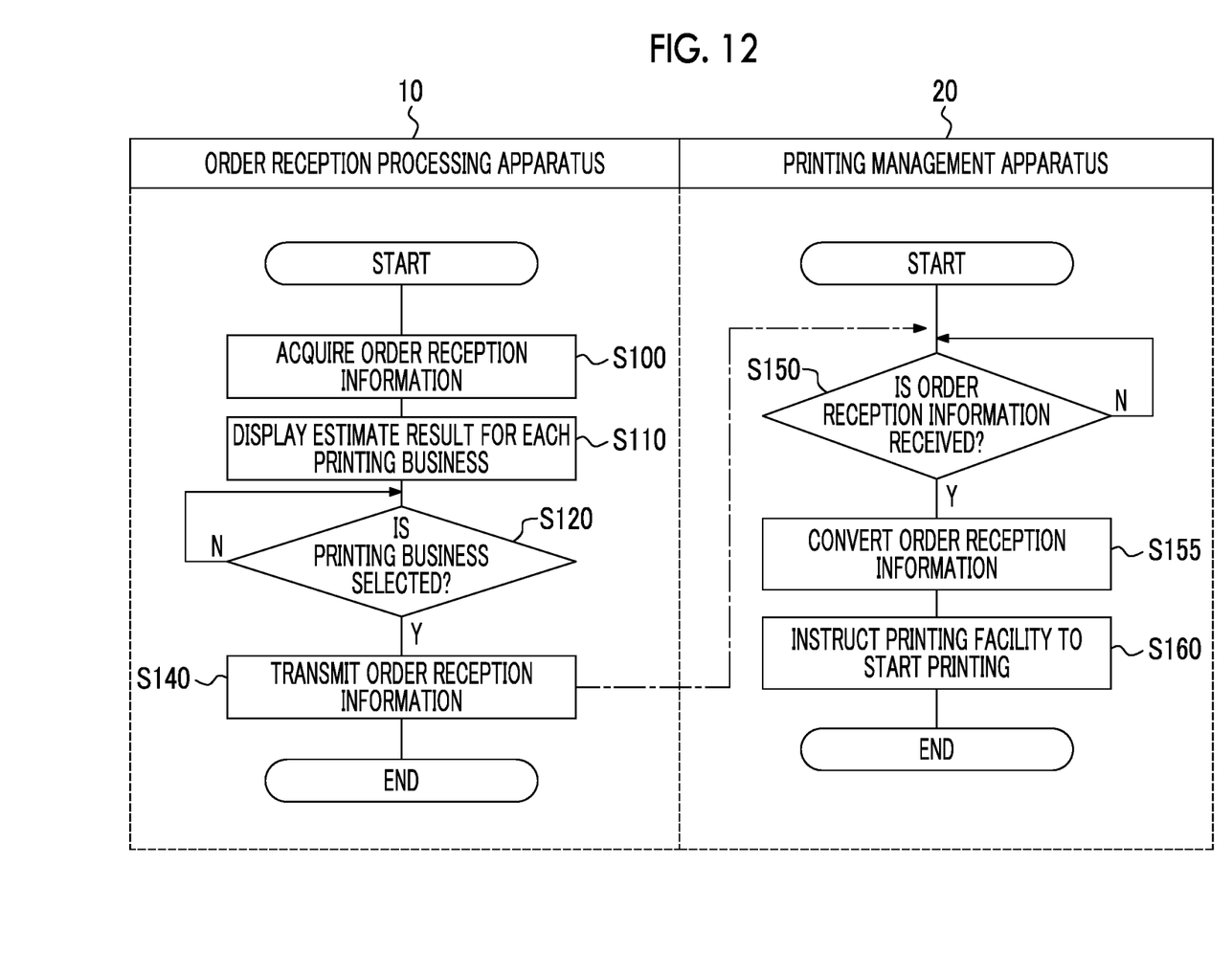
FIG. 12 is a flowchart illustrating one example of a flow of order reception processing in a case of converting the order reception information into printing information by the printing management apparatus.

FIG. 12 is a flowchart illustrating one example of a flow of order reception processing executed by the CPU 31 of the order reception processing apparatus 10 and the CPU 41 of the printing management apparatus 20 in a case of converting the contents of the items of the order reception information into the printing information by the printing management apparatus 20.

The flowchart of the order reception processing illustrated in FIG. 12 is different from the flowchart of the order reception processing illustrated in FIG. 10 in that step S130 is deleted from the order reception processing of the order reception processing apparatus 10, and that step S155 is added to the order reception processing of the printing management apparatus 20.

That is, in step S140, the CPU 31 of the order reception processing apparatus 10 transmits the order reception information such as the order reception information illustrated in FIG. 11 that includes the contents set by the customer on the order reception site, to the printing management apparatus 20 of the designated printing business.

In step S155, the CPU 41 of the printing management apparatus 20 that receives the order reception information converts, using the conversion rule 14, the content of each item of the order reception information into the printing information that is associated with the item of the order reception information and is unique to the printing business of the printing management apparatus 20. As a specific conversion method, processing identical to the conversion method described in step S130 in FIG. 10 may be performed.

Then, in step S160, the CPU 41 may print the printed matter of the received order by controlling the printing facility 22 in accordance with the order reception information in which the content of each item is converted into the printing information used by the printing business of the printing management apparatus 20 in step S155.

Even in this case, the CPU 41 may control the printing facility 22 and manage order reception of the printed matter by using the content set in each item of the order reception information after conversion.

While an example of storing the conversion rule 14 in the order reception processing apparatus 10 is described above, the printing management apparatus 20 of each printing business may store, in the non-volatile memory 44 of the printing management apparatus 20, the conversion rule 14 in which only the printing information used by the printing management apparatus 20 is associated. That is, the printing management apparatus 20 of the printing business A stores the conversion rules 14A and 14B in which the printing information of the other printing business, that is, the printing information of the printing business B, is excluded from each of the first conversion rule 14A illustrated in FIG. 8 and the second conversion rule 14B illustrated in FIG. 9. The printing management apparatus 20 of the printing business B stores the conversion rules 14A and 14B in which the printing information of the printing business A is excluded.

in such a situation, in a case where the printing management apparatus 20 converts the order reception information, the CPU 41 of the printing management apparatus 20 may convert the order reception information received from the order reception processing apparatus 10 using the conversion rule 14 stored in the non-volatile memory 44 of the printing management apparatus 20.

In addition, in such a situation, in a case where the order reception processing apparatus 10 converts the order reception information, the CPU 31 of the order reception processing apparatus 10 may convert the order reception information using the conversion rule 14 stored in the printing management apparatus 20 of each printing business registered in the order reception and placement system 1, and transmit the order reception information after conversion to the printing management apparatus 20 of the designated printing business.

While one aspect of the order reception and placement system 1 is described above using the exemplary embodiment, a disclosed form of the order reception and placement system 1 is one example, and the form of the order reception and placement system 1 is not limited to a scope disclosed in the exemplary embodiment. Various changes or improvements can be carried out to the exemplary embodiment without departing from a gist of the present disclosure. Forms to which the changes or the improvements are carried out also fall within a technical scope of the disclosure. For example, orders of the registration processing illustrated in FIG. 3 and the order reception processing illustrated in FIG. 10 and FIG. 12 may be changed without departing from the gist of the present disclosure.

In the present disclosure, a form of implementing the registration processing and the order reception processing by software is illustratively described. However, processing equivalent to the flowcharts illustrated in FIG. 3, FIG. 10, and FIG. 12 may be processed by hardware by implementing the processing in an application specific integrated circuit (ASIC), a field programmable gate array (FPGA), or a programmable logic device (PLD). In this case, an increase in speed of processing is achieved, compared to a case of implementing the registration processing and the order reception processing by software.

In such a manner, the CPU 31 of the order reception processing apparatus 10 and the CPU 41 of the printing management apparatus 20 may be replaced with dedicated processors such as an ASIC, an FPGA, a PLD, a graphics processing unit (GPU), and a floating point unit (FPU) specialized in specific types of processing.

In addition to a form of implementing processing of the order reception processing apparatus 10 and the printing management apparatus 20 by one CPU 31 and one CPU 41, respectively, the processing may be executed by a combination of two or more processors of identical types or different types. Furthermore, processing of the order reception processing apparatus 10 and processing of printing management apparatus 20 may be implemented by cooperation between processors present at physically separated locations.

While an example in which the information processing program is stored in each of the ROM 32 of the order reception processing apparatus 10 and the ROM 42 of the printing management apparatus 20 is described in the exemplary embodiment, a storage destination of the information processing program is not limited to the ROM 32 and the ROM 42. The information processing program according to the exemplary embodiment of the present disclosure can be provided in a form of a recording on a storage medium readable by the computer 30 and the computer 40. For example, the information processing program may be provided in a form of a recording on an optical disc such as a compact disk read only memory (CD-ROM) and a digital versatile disk read only memory (DVD-ROM). Alternatively, the information processing program may be provided in a form of a recording on a portable semiconductor memory such as a universal serial bus (USB) memory and a memory card. The ROM 32, the ROM 42, the non-volatile memory 34, the non-volatile memory 44, the CD-ROM, the DVD-ROM, the USB, and the memory card are one example of a non-transitory storage medium.

Furthermore, the order reception processing apparatus 10 and the printing management apparatus 20 may download the information processing program from the external apparatus through the communication unit 37 and the communication unit 47, respectively, and store the downloaded information processing program in the non-volatile memory 34 and the non-volatile memory 44, respectively. In this case, the CPU 31 of the order reception processing apparatus 10 and the CPU of the printing management apparatus 20 execute the registration processing and the order reception processing by reading the information processing program downloaded from the external apparatus.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to convert, using a conversion rule prescribing an association between order reception information on an article and manufacturing information used by each of a plurality of manufacturers manufacturing the article in accordance with the order reception information on the article, the order reception information into the manufacturing information used by a designated manufacturer that is requested to manufacture the article,
wherein the processor is further configured to convert, using the conversion rule, the manufacturing information that is used by each of the plurality of manufacturers and is associated with an item of the order reception information into a common expression used in the order reception information and then, display the converted manufacturing information on an order reception screen of the article.

2. The information processing apparatus according to claim 1,
wherein for each manufacturer, the conversion rule includes an association between an item of the order reception information and the manufacturing information on the article in an item identical to the item of the order reception information, and
the processor is configured to convert, using the conversion rule, a content of the item of the order reception information into the manufacturing information that is used by the designated manufacturer and is associated with the item of the order reception information.

3. The information processing apparatus according to claim 2,
wherein the processor is configured to convert a set content in the item of the order reception information into the manufacturing information that is used by the designated manufacturer and is associated with the item identical to the item of the order reception information.

4. The information processing apparatus according to claim 2,
wherein the processor is configured to, for an item of the order reception information of which a content is not set, perform conversion of setting the manufacturing information that is used by the designated manufacturer and is associated with the item identical to the item of the order reception information.

5. The information processing apparatus according to claim 4,
wherein in the conversion rule, in a case where an item of the order reception information of which a content is set is associated with the item of the order reception information of which the content is not set, the processor is configured to, for the item of the order reception information of which the content is not set, perform conversion of setting the manufacturing information that is used by the designated manufacturer and is associated with the item of the order reception information of which the content is set.

6. The information processing apparatus according to claim 5,
wherein in the conversion rule, a plurality of items of the order reception information of which contents are set is associated with the item of the order reception information of which the content is not set.

7. The information processing apparatus according to claim 4,
wherein a content of an item of the manufacturing information is a content related to at least one of a manufacturing step representing a difference in manufacturing method of the article, or a manufacturing facility.

8. The information processing apparatus according to claim 5,
wherein a content of an item of the manufacturing information is a content related to at least one of a manufacturing step representing a difference in manufacturing method of the article, or a manufacturing facility.

9. The information processing apparatus according to claim 6,
wherein a content of an item of the manufacturing information is a content related to at least one of a manufacturing step representing a difference in manufacturing method of the article, or a manufacturing facility.

10. The information processing apparatus according to claim 1,
wherein the article manufactured in accordance with the order reception information is a printed matter.

11. The information processing apparatus according to claim 2,
wherein the article manufactured in accordance with the order reception information is a printed matter.

12. The information processing apparatus according to claim 3,
wherein the article manufactured in accordance with the order reception information is a printed matter.

13. The information processing apparatus according to claim 4,
wherein the article manufactured in accordance with the order reception information is a printed matter.

14. The information processing apparatus according to claim 5,
wherein the article manufactured in accordance with the order reception information is a printed matter.

15. The information processing apparatus according to claim 6,
wherein the article manufactured in accordance with the order reception information is a printed matter.

16. The information processing apparatus according to claim 7,
wherein the article manufactured in accordance with the order reception information is a printed matter.

17. A non-transitory computer readable medium storing an information processing program causing a computer to execute a process, the process comprising:
converting, using a conversion rule prescribing an association between order reception information on an article and manufacturing information used by each of a plurality of manufacturers manufacturing the article in accordance with the order reception information on the article, the order reception information into the manufacturing information used by a designated manufacturer that is requested to manufacture the article; and
converting, using the conversion rule, the manufacturing information that is used by each of the plurality of manufacturers and is associated with an identical item of the order reception information into a common expression used in the order reception information and then, displaying the converted manufacturing information on an order reception screen of the article.

18. An article order reception and placement system comprising:
an order reception processing apparatus that functions as the information processing apparatus according to claim 1; and
a plurality of manufacturing management apparatuses that are installed for each of a plurality of manufacturers manufacturing an article in accordance with order reception information received by the order reception processing apparatus, and that manage manufacturing of the article,
wherein the order reception processing apparatus transmits, to the manufacturing management apparatus used by the designated manufacturer, the order reception information after conversion in which, using a conversion rule prescribing an association between the order reception information on the article and manufacturing information used by each of the plurality of manufacturers, the order reception information is converted into the manufacturing information used by a designated manufacturer that is requested to manufacture the article.

19. An article order reception and placement system comprising:
a plurality of manufacturing management apparatuses that are installed for each of a plurality of manufacturers manufacturing an article in accordance with order reception information, manage manufacturing of the article, and function as the information processing apparatus according to claim 1; and
an order reception processing apparatus that receives the order reception information,
wherein each manufacturing management apparatus converts, using a conversion rule prescribing an association between the order reception information and manufacturing information used for manufacturing the article by the manufacturer of the manufacturing management apparatus, the order reception information transmitted from the order reception processing apparatus into the manufacturing information.

* * * * *